United States Patent
Söderberg et al.

(10) Patent No.: US 7,997,471 B2
(45) Date of Patent: Aug. 16, 2011

(54) METHOD FOR PRODUCTION OF SPACERS FOR A NUCLEAR REACTOR

(75) Inventors: Håkan Söderberg, Västerås (SE); Thorbjörn Sahlin, Västerås (SE)

(73) Assignee: Westinghouse Electric Sweden AB (SE)

( * ) Notice: Subject to any disclaimer, the term of this patent is extended or adjusted under 35 U.S.C. 154(b) by 166 days.

(21) Appl. No.: 12/518,368

(22) PCT Filed: Jan. 10, 2008

(86) PCT No.: PCT/SE2008/050028
§ 371 (c)(1),
(2), (4) Date: Aug. 27, 2009

(87) PCT Pub. No.: WO2008/097169
PCT Pub. Date: Aug. 14, 2008

(65) Prior Publication Data
US 2010/0024194 A1 Feb. 4, 2010

(30) Foreign Application Priority Data
Feb. 5, 2007 (SE) ........................................ 0700273

(51) Int. Cl.
*B23K 31/02* (2006.01)
(52) U.S. Cl. .................. 228/101; 228/173.4; 228/173.6; 29/723
(58) Field of Classification Search .................. None
See application file for complete search history.

(56) References Cited

U.S. PATENT DOCUMENTS

| | | | |
|---|---|---|---|
| 4,985,199 A | 1/1991 | Irube et al. | |
| 5,331,679 A * | 7/1994 | Hirukawa | 376/439 |
| 5,625,657 A * | 4/1997 | Gallacher | 376/261 |
| 5,638,416 A * | 6/1997 | Oyama et al. | 376/442 |
| 5,666,389 A * | 9/1997 | Andersson et al. | 376/462 |
| 6,519,309 B1 * | 2/2003 | Van Swam | 376/442 |
| 6,650,723 B1 * | 11/2003 | Kang et al. | 376/439 |
| 2003/0012329 A1 * | 1/2003 | Yoon et al. | 376/442 |
| 2003/0138073 A1 * | 7/2003 | Oh et al. | 376/462 |
| 2004/0086072 A1 * | 5/2004 | Kang et al. | 376/439 |
| 2004/0196954 A1 * | 10/2004 | Stabel-Weinheimer et al. | 376/438 |

(Continued)

FOREIGN PATENT DOCUMENTS
EP 0 251 317 A2 1/1988
(Continued)

OTHER PUBLICATIONS

International Preliminary Report on Patentability for International Application No. PCT/SE2008/050028, dated Aug. 11, 2009.

Primary Examiner — Kiley Stoner
(74) Attorney, Agent, or Firm — Alston & Bird LLP

(57) ABSTRACT

A method for production of spacers to hold at least a number of elongated fuel rods (5) in a fuel unit (20) for placement in a re-actor (1) is described. The method comprises the steps of providing at least two spacers (30), to provide a set of mandrels (40) comprising a number of mandrels (42), to arrange at least two spacers (30) with one on top of the other on the set of mandrels (40), and to heat treat the spacers (30) when they are arranged on the set of mandrels (40) so that the cells (31) in the spacers (30) adapts to the mandrels (42).

16 Claims, 7 Drawing Sheets

U.S. PATENT DOCUMENTS

| | | | |
|---|---|---|---|
| 2005/0220261 A1* | 10/2005 | Kreuter et al. | 376/443 |
| 2005/0226358 A1* | 10/2005 | Bonnamour et al. | 376/438 |
| 2007/0211843 A1* | 9/2007 | Smith et al. | 376/438 |
| 2007/0242793 A1* | 10/2007 | Song et al. | 376/438 |
| 2008/0118019 A1* | 5/2008 | Burfin et al. | 376/438 |
| 2008/0205579 A1* | 8/2008 | Rozhkov et al. | 376/439 |
| 2008/0232536 A1* | 9/2008 | Helmersson et al. | 376/438 |
| 2008/0232537 A1* | 9/2008 | Reparaz et al. | 376/438 |
| 2008/0267339 A1* | 10/2008 | Helmersson et al. | 376/438 |
| 2008/0267340 A1* | 10/2008 | Higgins | 376/438 |
| 2009/0067566 A1* | 3/2009 | Rozhkov et al. | 376/439 |
| 2009/0257546 A1* | 10/2009 | Lu et al. | 376/438 |
| 2009/0296876 A1* | 12/2009 | D'Uston De Villereglan et al. | 376/442 |
| 2010/0098208 A1* | 4/2010 | Eom et al. | 376/442 |
| 2010/0322371 A1* | 12/2010 | Jiang et al. | 376/439 |

FOREIGN PATENT DOCUMENTS

| | | |
|---|---|---|
| EP | 0 307 268 A1 | 3/1989 |
| FR | 2 665 293 A1 | 1/1992 |
| GB | 2 003 775 A | 3/1979 |
| JP | 06-148370 A * | 5/1994 |
| JP | 07-225291 A * | 8/1995 |

* cited by examiner

METHOD FOR PRODUCTION OF SPACERS FOR A NUCLEAR REACTOR

TECHNICAL FIELD

The present invention relates to a method for production of spacers for holding a number of fuel rods in a reactor in a nuclear installation of light water type, especially a boiling water reactor, BWR, or a pressurised water reactor, PWR.

DESCRIPTION OF THE PRIOR ART

The present invention relates to a method for production of a spacer for holding a number of elongated fuel rods intended to be placed in a nuclear installation, wherein the spacer encloses a number of cells which each have a longitudinal axis and is arranged to receive a fuel rod in such a way that the fuel rod extends parallel to the longitudinal axis, wherein each cell is formed by a sleeve-like part which has an upper edge and a lower edge, wherein the sleeve-like part comprises a number of elongated contact surfaces which extends essentially parallel to the longitudinal axis for abutment against the fuel rod which is to be received in the cell.

In a reactor for a nuclear installation of the type described above, a large number of elongated fuel units are arranged in the reactor core. Each fuel unit comprises a number of elongated fuel rods. Each fuel rod comprises an elongated cladding tube and a number of fuel pellets which are arranged in a stack in the cladding tube. The fuel rods in the fuel unit are kept together by a number of spacers, for example 3-10 spacers, which are distributed along the length of the fuel unit. Each spacer defines cells for reception of fuel rods. The spacers thus hold the fuel rods in a correct position in the fuel unit and have the purpose of securing that a constant mutual distance is maintained between the fuel rods during operation of the reactor.

In a boiling water reactor the fuel rods are usually enclosed in cases, so-called boxes. Each box comprises a relatively large number of fuel rods and forms together with these fuel rods a so-called fuel assembly which may be lifted into and out of the reactor core. Each fuel assembly may comprise one or more fuel units. U.S. Pat. No. 5,875,223 describes a fuel assembly with four such fuel units. The core is submersed in a coolant, usually water, which acts both as coolant and as moderator. The fuel units and the fuel rods are usually arranged essentially vertically in the reactor.

There exists spacers of a number of different types, for example spacers formed by crossed plates, spacers where the cells are formed by open elements with support points and spring means, and spacers formed by sleeve-like parts which are welded together with each other. The spacers which are used today are usually produced by zirconium-based alloys (Zircaloy), nickel-based alloys (Inconel), combinations of these alloys or stainless steel.

JP-6-148370 describes a sleeve spacer for a boiling water reactor. Each sleeve has inward bends for abutment against the fuel rod, which extends through the sleeve. The inward bends extend only over a small portion of the length of the sleeve. Each sleeve is also, according to an example, provided with a bevelling at the lower end. According to another example, each sleeve has a waveform at the lower end of the sleeve.

JP-7-225291 describes another sleeve spacer for a boiling water reactor. The circularly cylindrical sleeves are in this case provided with an upper, downstream end that has triangular or rectangular protrusions, which extends upwards. The lower end of the sleeve seems to be straight. Each sleeve may also comprise inward bends, which extends over only a part of the length of the sleeve for abutment against the fuel rod, which extends through the sleeve.

U.S. Pat. No. 5,331,679 describes another variant of a sleeve spacer with essentially circularly cylindrical sleeves. The spacer is held together by means of a band which extends around the outer circumference of the spacer. Each sleeve has relatively short inward bends which together with a spring element forms abutment points against the fuel rod which extends through the sleeve.

As has been mentioned above, the number of spacers in a fuel unit may be in the order of 3-10. Each one of the fuel rods extends through essentially all the spacers in the fuel unit. It is desirable that the fuel rods are not bent or exposed to loads perpendicularly to their length axis. To this end it is necessary that each one of the cells in a spacer is arranged in line with the corresponding cells in the other spacers. In order to achieve this, mandrel arrangements are used during the production of the spacers. According to the prior art, the spacers have been produced by a number of sleeve means being welded together to a spacer. The spacer has then been placed on a set of mandrels, comprising as many mandrels as the number of cells in the spacer, so that one mandrel has been arranged in each cell. After the spacer has been placed on the set of mandrels, the spacer has been heat treated so that the form of the spacer has been adapted to the mandrels in the set of mandrels. On condition that the mandrels are arranged at the same mutual distance and are mutually parallel, it is possible with the method to produce spacers which may be placed in a fuel unit so that the fuel rods are not subject to any tensions perpendicular to the length axis. However, it has been shown that the mandrels in the set of mandrels may bend somewhat when a spacer is arranged on the set of mandrels. This will lead to the end result after the heat treatment being dependent on the mutual positions of the cells before the heat treatment. Thus, not all spacers which are produced after each other will have the cells in the same mutual positions.

SUMMARY OF THE INVENTION

An object with the present invention is to provide a method for production of spacers by which method the relative positions of the cells are the same for all spacers produced with the method.

According to a first aspect of the present invention a method is provided for production of spacers to hold at least a number of elongated fuel rods in a fuel unit arranged to be placed in a nuclear installation, wherein each spacer comprises a number of cells which each has a longitudinal axis and is arranged to receive a fuel rod in such a way that the fuel rod extends parallel to the longitudinal axis, and wherein each one of the cells comprises a number of abutment surfaces which extends essentially parallel to the longitudinal axis for abutment against the fuel rod which is to be received in the cell. The method comprises the step of providing at least two spacers, and is characterised by the steps of providing a set of mandrels comprising a plurality of mandrels with corresponding longitudinal axis, which mandrels are arranged on a common base and which mandrels mutually are arranged with the length axis essentially parallel, to arrange at least two spacers with one on top on the other on the set of mandrels so that mandrels are arranged through all cells in all spacers with a longitudinal axis of the mandrel essentially parallel to the longitudinal axis of the cells so that cells which are arranged on top of each other are intersected by the common mandrel, and to heat-treat the spacers when they are arranged on the set of mandrels so that the cells in the spacers are adapted to the mandrels.

In the same way as in the prior art, the relative positions of the cells in relation to the relative positions of the mandrels will lead to separate mandrels being exposed to forces from the spacer. This will lead to bending of the mandrels. With the method according to the invention the bending of separate mandrels will however be less than in the prior art as the corresponding cells in different spacers arranged on top of each other will be displaced in different directions. A mandrel, which is subject to a force in one direction by a first spacer, may, for example, be subject to a force in essentially the opposite direction by a second spacer. The force, which acts on a mandrel, will be a sum of the forces that each one of the spacers effects the mandrel with. By arranging a number of spacers on top of each other, separate mandrels will, thus, not bend as much as according to the prior art. Accordingly, the correction of the position of a cell in the spacer will be made in a better way than in methods according to the prior art as the cells of the spacer will adapt to the positions of the mandrels in the subsequent heat treatment.

The mandrels in the set of mandrels may be pipe-formed. It is of course possible to arrange solid mandrels in the set of mandrels but by making them pipe-formed the mandrels are heated faster during the heat treatment which provides for the heat treatment to be performed in a shorter time than with solid mandrels.

As mentioned above at least two spacers are arranged on the set of mandrels before the heat treatment. However, it has been found that better results are achieved when at least three spacers are arranged on the set of mandrels before the heat treatment. This may be explained by the fact that it is more probable that the forces from the spacers on a separate mandrel in the set of mandrels essentially cancel each other when at least three spacers are arranged on top of each other on the set of mandrels.

The mandrels on the set of mandrels may be set in a first position before the spacers are arranged on the set of mandrels, in which first position it is possible to arrange a spacer on the set of mandrels without the mandrels coming in contact with the spacer. After the spacers have been arranged on the set of mandrels, the mandrels on the set of mandrels may be set in a second position by turning the mandrels around their longitudinal axis before the beginning of the heat treatment, in which second position the mandrels are in contact with the abutment surfaces on the cells. By such a method the arrangement of the spacers on the set of mandrels is facilitated as the arrangement may be done without frictional resistance between the spacers and the mandrels. In order to achieve the desired object it is required that the form of each one of the mandrels perpendicular to the longitudinal axis is not circular.

Each one of the mandrels on the set of mandrels may, in a cross-section perpendicular to the longitudinal axis of the mandrel, have the form of a truncated circle. With truncated circle is meant that the outer form of a cross-section of the mandrel is comprised by segments of a circle connected with straight parts. It is possible to achieve the same result also with other forms on the cross-section of the mandrel.

The heat treatment may be performed at a temperature in the interval 650° C.-740° C., and preferably in the interval 690° C.-720° C. These temperature intervals have shown to be favourable in order to achieve the desired adaptation of the cells of the spacers to the mandrels. Before the heat treatment strains are transmitted from the mandrels to the spacer. During the heat treatment the internal tensions in the spacer are released and the relative distances between the cells in the spacer are adapted to the relative distances between mandrels on the set of mandrels.

The heat treatment may continue during 17-23 hours, and preferably during 19-21 hours. The mentioned time intervals have proved to be suitable in order for the tensions in the spacer to be released. This is particularly true in the case of the heat treatment being performed in the above-mentioned temperature intervals.

The step of providing the spacer may comprise the steps of providing, for each spacer, a set of sleeve-like parts which has an upper edge and a lower edge, to join each set of sleeve-like parts to a spacer so that each sleeve-like part forms a cell in the spacer. With such a method each cell in the spacer may be produced so that it fits the fuel rod which is to be arranged through the cell. However, the relative positions for the cells may vary from spacer to spacer.

Each one of the sleeve-like parts may essentially have the form of a circular cylinder. Circularly cylindrical sleeve-like parts are relatively simple to produce.

The cross-section perpendicular to the longitudinal axis of each one of the sleeve-like parts may alternatively essentially have the form of an octagon. With such a cross-section on the sleeve-like parts it will be easier to join the sleeve-like parts to a spacer compared with the case that the sleeve-like parts has an essentially circular cross-section.

The sleeve-like parts may be joined side by side. Alternatively, the sleeve-like parts may be joined with further parts between the sleeve-like parts in order to create larger channels for cooling water between the cells.

The sleeve-like parts may be joined through welding. Welding is a relatively uncomplicated but still strong way of joining the sleeve-like parts.

The step of providing said spacer may comprise the steps of providing a set of straight plates, and to join the plates crossed so that the cells are created by the spaces between the crossed plates. A spacer produced in this way is usually designated egg-box spacer. During the subsequent arrangement on the set of mandrels and the subsequent heat treatment the walls which are comprised of the straight plates will bend so that the cells are adapted to the set of mandrels.

The material in the spacers may consist of any one of a zirconium-based alloy, a nickel-based alloy and stainless steel. It is also possible to use other materials in the spacer, which materials are suitable for use in nuclear reactors.

In the following preferred embodiments of the invention will be described with reference to the appended drawings.

SHORT DESCRIPTION OF THE DRAWINGS

DESCRIPTION OF PREFERRED EMBODIMENTS OF THE INVENTION

Figure 1:
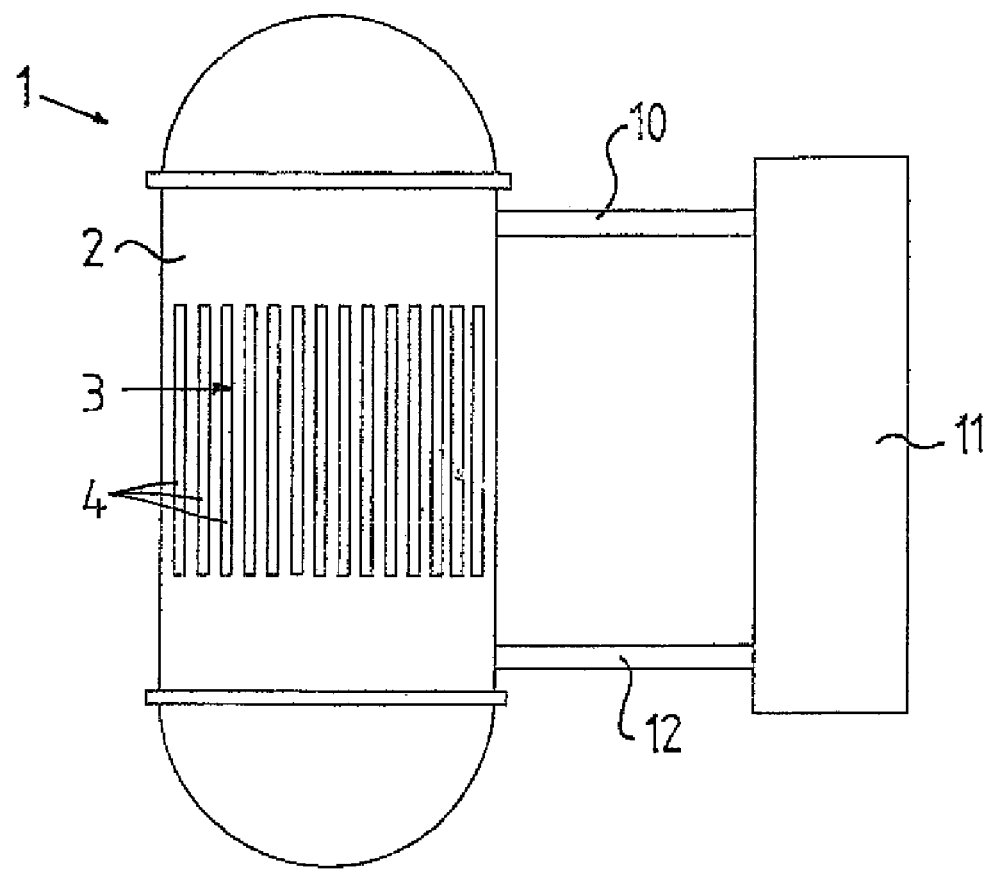
FIG. 1 shows schematically a nuclear installation in which spacers produced with the method according to the invention are to be arranged.

In the following description of preferred embodiments of the invention, similar parts in different figures will be denoted with the same reference numeral.

FIG. 1 shows schematically a reactor 1 in which spacers produced with the method according to the invention are to be arranged. The reactor 1 comprises a reactor tank 2, which encloses a core 3, which comprises a number of fuel assemblies 4. A coolant flows through the reactor tank, which coolant is heated during the passage through the reactor tank 2. Water vapour is transported from the reactor tank 2 to and from an energy extraction unit 11 through first pipes 10 and second pipes 12, respectively. In the energy extraction unit 11 thermal energy is received from the coolant. The energy extraction unit 11 may for example comprise a turbine and a condenser (not shown). The reactor 1 may be of the boiling water type, BWR, wherein water is used as a coolant and wherein the water is vaporised in the reactor tank 2 and is transported to the energy extraction unit 11 as water vapour in order to drive a stream turbine. Alternatively, the reactor 1 may be of the pressurised water type, PWR, wherein water is used as a coolant and wherein the cooling water is directed to a heat exchanger for vaporisation of another medium in another circuit comprising a turbine.

Figure 2:
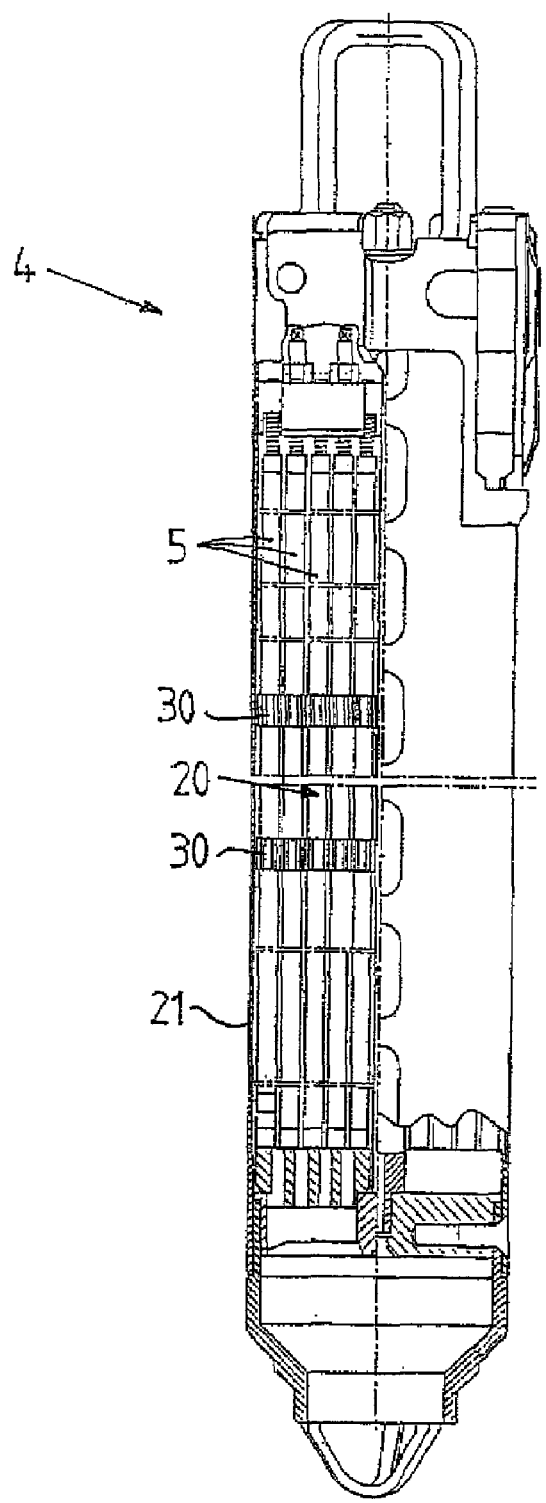
FIG. 2 shows schematically a fuel assembly for a boiling water reactor.

FIG. 2 shows schematically a fuel assembly 4 for a boiling water reactor. In the shown embodiment, the fuel assembly 4 comprises four fuel units 20, each comprising a number of fuel rods 5 and is placed in an adherent space in a box 21. Cooling channels extend between these spaces and the four fuel units 20. Each fuel unit 20 is held together by means of a number of spacers 30, usually 3-10 spacers.

Figure 3:
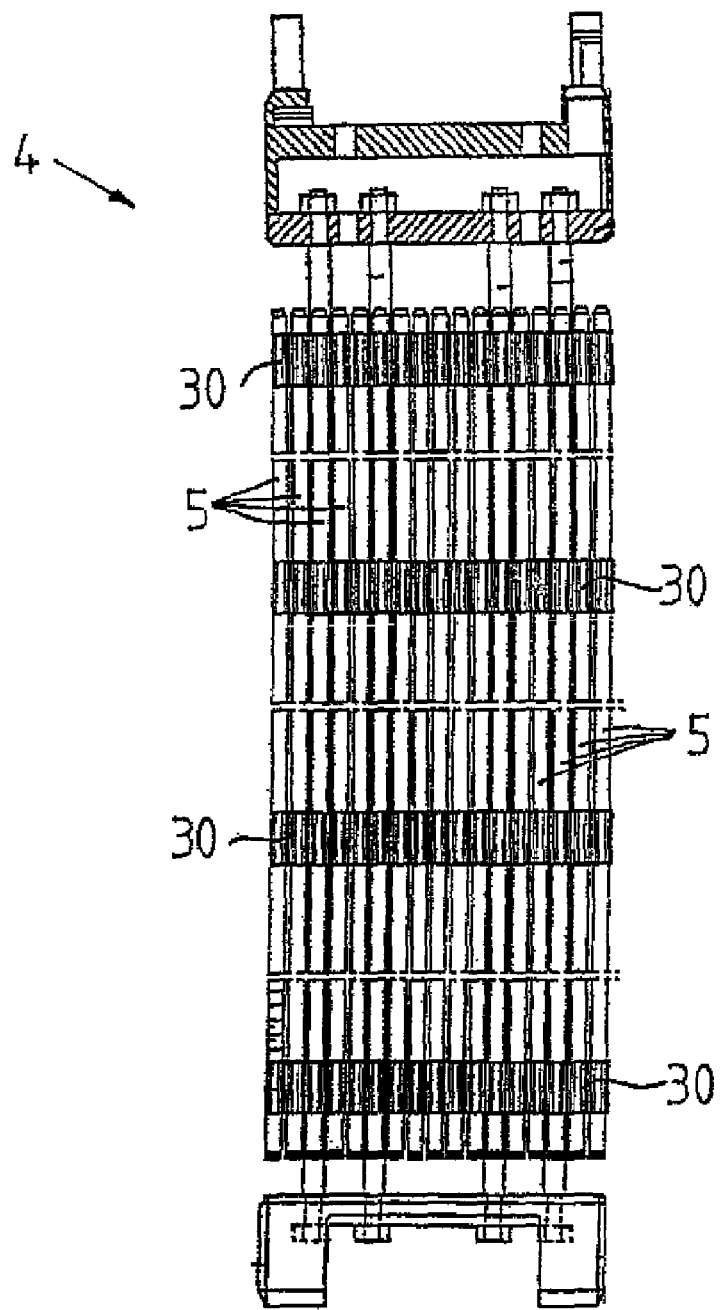
FIG. 3 shows schematically a fuel assembly for a pressurized water reactor.

FIG. 3 shows schematically a fuel assembly 4 for a pressurised water reactor. The fuel assembly 4 comprises a fuel unit 20, which comprises a number of fuel rods 5. The fuel rods 5 in the fuel unit 20 are held together by means of spacers 30.

Figure 4:
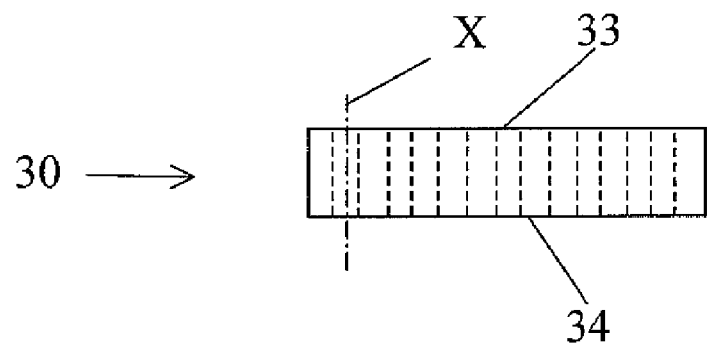
FIG. 4 shows schematically a spacer according to the first embodiment of the present invention in a view from the side of the spacer.
Figure 5:
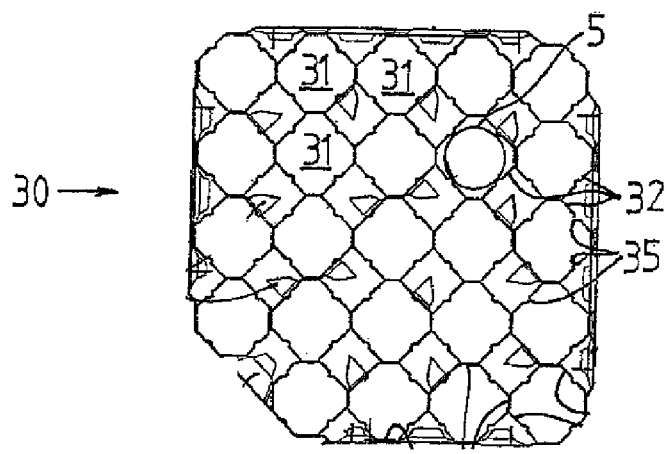
FIG. 5 shows schematically the spacer in FIG. 4 in a view from above.

FIGS. 4 and 5 shows schematically a spacer 30 according to a first embodiment of the present invention. FIG. 4 shows the spacer 30 from the side while FIG. 5 shows the spacer 30 from above. The spacer 30 encloses a number of cells 31, which each have a longitudinal axis x which is intended to extend essentially vertically when the fuel unit 20 is placed in a reactor 1. Each such cell 31 is in the described embodiment arranged to receive a fuel rod 5 in such a way that the fuel rod extends parallelly to the longitudinal axis x. Each cell 31 is formed by a sleeve-like part 32, which each has an upper edge 33 and a lower edge 34. The sleeve-like part 32 also comprises four elongated abutment surfaces 35, which in the shown embodiment are elevated from the surrounding material in the adherent sleeve-like part 32. Each one of the sleeve-like parts 32 in FIG. 5 has, perpendicular to the longitudinal direction x, essentially the form of an octagon. The sleeve-like parts 32 are made of metal.

It is known in the prior art to use one of a number of metals for spacers 30. Examples of metals that may be used for the spacers 30 are zirconium-based alloys, nickel-based alloys as well as stainless steel. The sleeve-like parts 32 may be joined in any way known in the prior art in order to join the components. It is for example possible to weld the sleeve-like parts 32 together. According to the shown embodiment, the sleeve-like parts 32 are joined side by side without any further component between the different sleeve-like parts 32.

Figure 6:
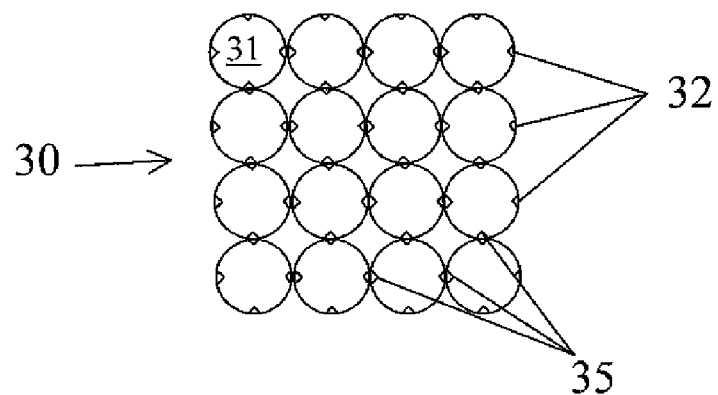
FIG. 6 shows schematically a spacer according to a second embodiment of the present invention.

FIG. 6 shows schematically a spacer 30 according to a second embodiment of the present invention, in which the cells 31 are formed by sleeve-like parts 32 which each essentially has the form of a circular cylinder. The sleeve-like parts 32 comprises also four elongated abutment surfaces 35 which in the shown embodiment are elevated and deviates from the circularly cylindrical form.

Figure 7:
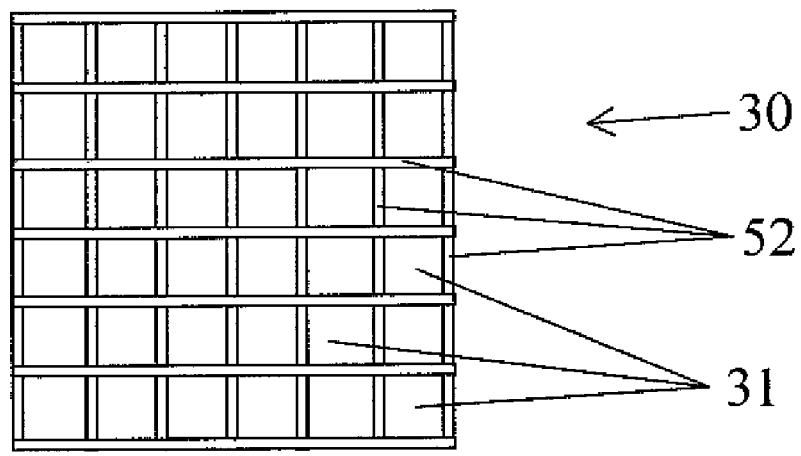
FIG. 7 shows schematically a spacer according to a third embodiment of the present invention.

FIG. 7 shows schematically a spacer 30 according to a third embodiment of the present invention. The spacer 30 has been produced by joining straight plates 52, which have been crossed with each other so that each one of the cells 31 in the spacer 30 is defined by the space between two pairs of parallelly arranged plates 52, which pairs are arranged perpendicular to each other.

Figure 8:
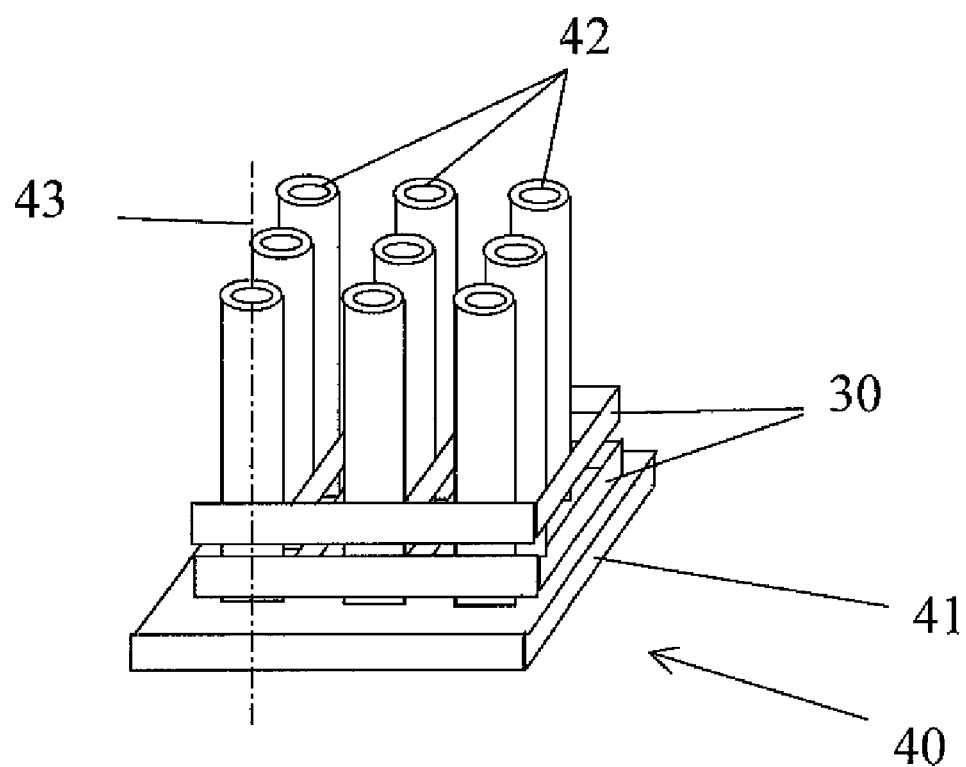
FIG. 8 shows a set of mandrels on which there is arranged two spacers in accordance with the method according to the present invention.

FIG. 8 shows a set of mandrels 40 on which there is arranged two spacers 30 in accordance with the method according to the present invention. The set of mandrels 40 comprises a base 41 on which base a set of pipe-formed mandrels 42 are arranged, which mandrels comprise a longitudinal axis 43. The mandrels 42 are mutually arranged with their longitudinal axes 43 essentially parallelly arranged. Each one of the mandrels is pipe-formed with an interior side, which essentially has the form of a circular cylinder, and an exterior side which perpendicular to the longitudinal axis essentially has the form of a truncated circle. By truncated circle is meant a form which comprises segments of a circle 44 with straight sections 45 between the segments of a circle 44 as is shown in larger detail in FIG. 9. Each one of the mandrels 42 is turnable around its longitudinal axis.

Figure 9:
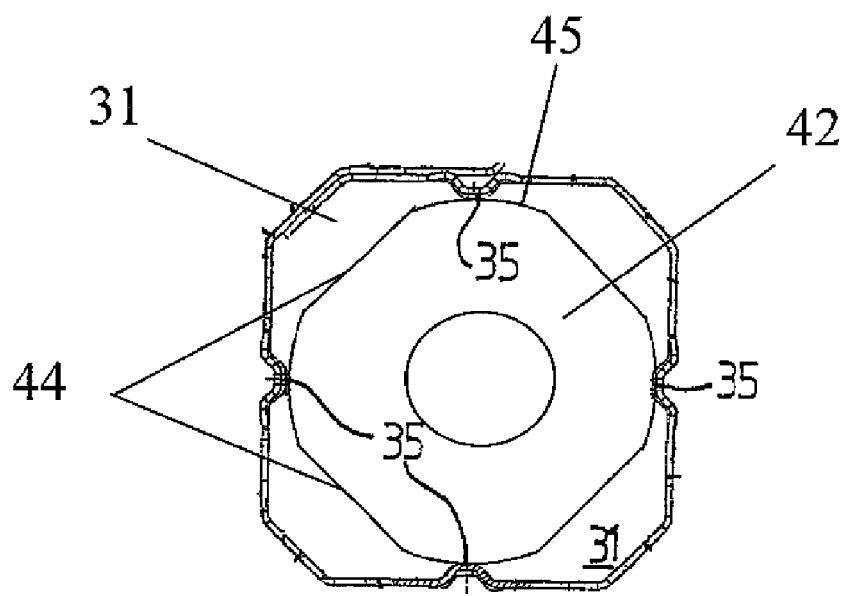
FIG. 9 shows in larger detail a cross-section of a mandrel in the set of mandrels in FIG. 8, which mandrel is arranged in a cell in a spacer.

FIG. 9 shows in larger detail a cross-section of a mandrel 42 in the set of mandrels 40 in FIG. 8, which mandrel 42 is arranged in a cell 31 in a spacer 30. The mandrel in FIG. 9 has the form of a truncated circle with segments of a circle between straight sections 45. The mandrel is adjustable in two different positions by turning around the longitudinal axis of the mandrel. In FIG. 9 the mandrel is positioned in a first position so that the segments of a circle are in contact with the abutment surfaces 35 of the sleeve-like part 32. By turning of the mandrel 45° around the longitudinal axis the mandrel is positioned in its second position in which the segments of a circle are arranged between the abutment surfaces.

Figure 10:
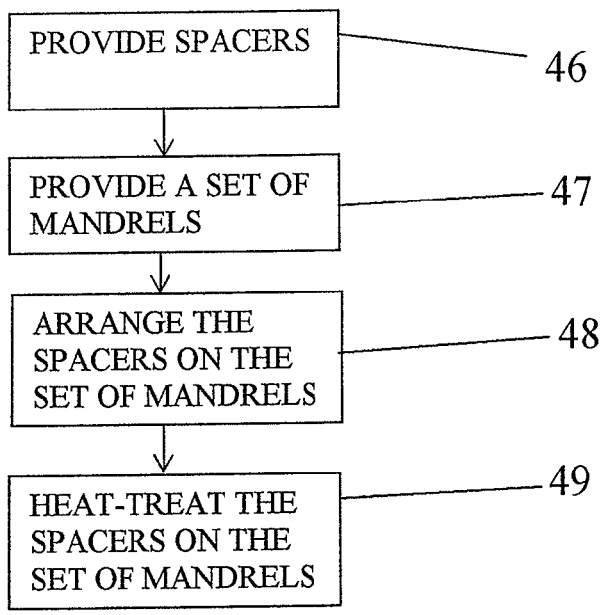
FIG. 10 is a flow sheet over the production of spacers in accordance with an embodiment of the present invention.

FIG. 10 is a flow sheet over the production of spacers in accordance with an embodiment of the present invention. In a first providing step 46 at least two spacers 30, according to anyone of the embodiments which have been described above, are provided. In a second providing step 47 a set of mandrels comprising a number of mandrels in accordance with the above description, is provided. In an arrangement step 48 the spacers 30 are arranged on top of each other on the set of mandrels so that mandrels are arranged through all cells in all spacers with the longitudinal axes of the mandrels essentially parallel to the longitudinal axes of the cells. In a heat treatment step 49 the spacers are heat treated when they are arranged on the set of mandrels.

The heat treatment is performed at a temperature in the interval 650° C.-740° C., and preferably in the interval 690° C.-720° C. A suitable temperature has proved to be 705° C. The heat treatment is performed during 17-23 hours and preferably during 19-21 hours. A suitable time period for the heat treatment has proved to be 20 hours.

Figure 11:
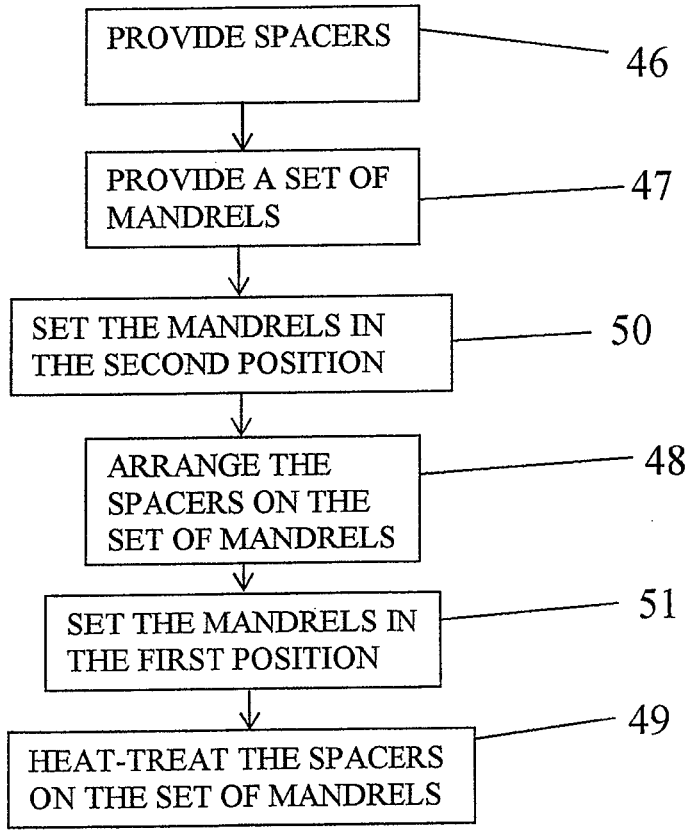
FIG. 11 is a flow sheet over the production of spacers in accordance with an alternative embodiment of the present invention.

FIG. 11 is a flow sheet over the production of spacers in accordance with an alternative embodiment of the present invention. Only the differences between the method that is described with reference to FIG. 10 and the method that is described with reference to FIG. 11, will be described. The mandrel 42 in the set of mandrels 40, which is used in the method according to this alternative embodiment, are turnable around their longitudinal axis. In a first setting step 50 which precedes the arrangement step 48, each one of the mandrels 42 are positioned in the second position in which second position it is possible to arrange spacers on the set of mandrels 40 without the mandrels coming into contact with the abutment surfaces 35 in the cells 31. After the arrangement step 48 a second setting step 51 is also performed in which the mandrels 42 are turned to the first position in which the mandrels are in contact with the abutment surfaces 35 in the cells 31.

The described embodiments may be modified in many ways without departing from the spirit and the scope of the present invention which is limited only by the appended claims.

It is possible to arrange an arbitrary number of spacers on top of each other on the set of mandrels before the heat treatment.

It is possible within the scope of the invention to perform the heat treatment at other temperatures than those which have been stated as most preferable.

The invention claimed is:

1. A method for production of spacers to hold a number of elongated fuel rods in a fuel unit for placement in a reactor, wherein each spacer encloses a number of cells each of which has a longitudinal axis (x) and is arranged to receive a fuel rod in such a way that the fuel rod extends parallel to the longitudinal axis (x), wherein each of the cells comprises a number of abutment surfaces which extend essentially parallel to the longitudinal axis (x) for abutment against the fuel rod which is to be received in the cell, the method comprising the steps of;

providing at least two spacers,
providing a set of mandrels comprising a plurality of mandrels each having a longitudinal axis, which mandrels are arranged on a common base and which mandrels are mutually arranged with their longitudinal axes essentially parallel,
arranging the at least two spacers one on top of another such that the at least two spacers have corresponding cells thereof arranged one atop another, and arranging the set of mandrels so that the mandrels are received through the cells in one of the spacers and through the corresponding cells in each of the other spacers, with the longitudinal axes of the mandrels essentially parallel to the longitudinal axes (x) of the cells, so that cells which are arranged on top of each other are intersected by a common mandrel, and
heat treating the spacers when they are arranged on the set of mandrels so that internal tensions in the spacers are released and relative distances between the cells in the spacers are adapted to relative distances between the mandrels.

2. The method according to claim 1, wherein the mandrels are pipe-shaped.

3. The method according to claim 1, wherein at least three spacers are arranged on the set of mandrels before the heat treatment.

4. The method according to claim 1, wherein the mandrels are each set in a first position before the spacers are arranged on the set of mandrels, in which first position it is possible to arrange a spacer on the set of mandrels without the mandrels coming in contact with the spacer, and wherein the mandrels are each set in a second position by turning the mandrels around the longitudinal axes of the mandrels before the heat treatment is commenced, in which second position the mandrels are in contact with the abutment surfaces of the cells.

5. The method according to claim 4, wherein each one of the mandrels on the set of mandrels in a cross-section, perpendicularly to the longitudinal axis of the mandrel, has the form of a truncated circle.

6. The method according to claim 1, wherein the heat treatment is performed at a temperature in the interval 650° C.-740° C.

7. The method according to claim 6, wherein the heat treatment continues for 17-23 hours.

8. The method according to claim 1, wherein the step of providing said spacers comprises the steps for each spacer of providing a set of sleeve-shaped parts which have an upper edge and a lower edge, and joining each set of sleeve-shaped parts to a spacer so that each sleeve-shaped part forms a cell in the spacer.

9. The method according to claim 1, wherein each one of the sleeve-shaped parts has the form of a circular cylinder.

10. The method according to claim 8, wherein a cross-section perpendicular to the longitudinal axis of each one of the sleeve-shaped parts essentially has the form of an octagon.

11. The method according to claim 10, wherein sleeve-shaped parts are joined side by side.

12. The method according to claim 8, wherein the sleeve-shaped parts are joined by means of welding.

13. The method according to claim 1, wherein the step of providing said spacers comprises the steps of providing a set of straight plates arranged crossed relative to one another, and joining the plates so that the cells are formed by spaces between the crossed plates.

14. The method according to claim 1, wherein the spacers are formed of a zirconium-based alloy.

15. The method according to claim 1, wherein the spacers are formed of a nickel-based alloy.

16. The method according to claim 1, wherein the spacers are formed of stainless steel.

* * * * *